Patented Jan. 11, 1944

2,338,958

UNITED STATES PATENT OFFICE 2,338,958

CLARIFICATION OF LIQUIDS

Irving E. Muskat, Akron, Ohio, assignor to Pittsburgh Plate Glass Company, Allegheny County, Pa., a corporation of Pennsylvania No Drawing. Application November 7, 1940,
Serial No. 364,699

5 Claims. (Cl. 210—23)

This invention relates to the clarification of liquids such as water and water solutions and to flocculating agents which assist such clarification. The removal of solid suspended matter, such as sewage, from aqueous liquors often is a very slow process unless agencies tending to promote more rapid clarification are resorted to. Prior to this invention, it has been the practice to treat aqueous suspensions such as sewage sludges with certain chemical flocculating agents, such as ferric chloride in order to facilitate the removal of the solid matter suspended therein.

In accordance with my invention, I have found that the presence of a chloride of chromium, such as chromic or chromous chloride, assists the flocculating action of ferric chloride and permits a more complete and more rapid removal of solids suspended in aqueous liquors than is possible with ferric chloride alone. In addition, the presence of the chromium appears to greatly assist in decolorizing these liquors. Thus, I find that a very effective clarification and decolorizing of aqueous sludges such as sewage may be secured by concurrent treatment with an iron chloride, such as ferric chloride and a chloride such as chromic chloride. Moreover, the presence of the chrome chloride improves the bactericidal and fungicidal characteristics of the treatment. The two agents may be separately added to the sludge or they may be mixed to form a coagulating composition and added to the sludge as a mixture.

While the relative concentration of chromic chloride used in the composition may be varied considerably in most cases, the concentration of the chromic chloride used should not exceed 20 percent by weight of the total composition and it is preferred that the concentration be below 10 percent. Chromic chloride in concentrations as low as 0.5 percent appears to have a beneficial effect upon the action of iron chloride and concentrations in excess of 20 percent appear to have some value.

Both ferric and ferrous iron may be used as coagulants but it has been found that ferric chloride is a more effective coagulant than ferrous chloride. In a similar manner, chromous chloride may be used in the composition although chromic chloride appears to be the most suitable.

Treatment with my composition may be carried out with liquids having widely varying hydrogen concentrations, the conditions of operation being similar to those used with ferric chloride alone. Operation within a pH range of 3.5–9.5 appears to yield superior results, however. The pH of the liquor to be treated may, if desired, be adjusted before beginning treatment by any convenient means, as for example, by addition of lime or carbon dioxide.

The following examples are illustrative:

Example I

A sewage sludge having an average solid content of about 490 parts per million was adjusted to a pH of 5.3 and treated with 5 grains per gallon of a composition containing 5 per cent chromic chloride, the balance being ferric chloride, and allowed to settle for 10 hours. Over 96 percent of the suspended solids were removed.

Example II

The pH of a brown-colored aqueous liquor containing 325 parts per million of suspended solids was adjusted to 2.5 and was treated with 10 grains per gallon of a composition containing 0.8 percent chromic chloride and the balance ferric chloride, and the mixture was allowed to settle. Approximately 98 percent of the solids were removed and the supernatant liquid was very clear.

The concentration of the ferric chloride and chromium tetrachloride necessary is dependent largely upon the amount and character of the materials present. In general, a total of less than about 15–20 grains of the two compounds per gallon of sewage or other aqueous suspension is found to be necessary, although larger concentrations may be used, if desired.

The process may be used to clarify or decolorize various types of aqueous liquors. Thus, sewage, industrial wastes, sugar solutions, leaching solutions, obtained from ore recovery processes, etc., may be treated in this manner with my composition.

Although the present invention has been described with reference to the specific details of certain embodiments thereof, it is not intended that such details shall be regarded as limitations upon the scope of the invention except insofar as included in the accompanying claims.

I claim:

1. A flocculating agent for the removal of suspended solids from aqueous suspensions in the clarification of liquids comprising an iron chloride and a substantial quantity of a chromium chloride, the chromium chloride being present in amounts up to about 20 percent by weight.

2. A flocculating agent for the removal of suspended solids from aqueous suspensions in the clarification of liquids comprising ferric chloride and a substantial quantity of chromic chloride, the chromic chloride being present in amounts up to about 20 percent by weight.

3. A flocculating agent for the removal of suspended solids from aqueous suspensions in the clarification of liquids comprising ferric chloride and from about 0.5 to 10 percent by weight of chromic chloride.

4. The method of removing suspended solids from aqueous dispersions thereof which comprises introducing a flocculating agent composed of an iron chloride admixed with from 0.5 to 20 per cent by weight of a chromium chloride into the dispersion, holding the treated dispersion for a time sufficient to afford settling of the solids, and separating the supernatant liquid.

5. The method of removing suspended solids from aqueous dispersions thereof which comprises introducing a flocculating agent composed of ferric chloride admixed with from 0.5 to 10 percent by weight of chromic chloride into the dispersion, holding the treated dispersion for a time sufficient to afford settling of the solids, and separating the supernatant liquid.

IRVING E. MUSKAT.